UNITED STATES PATENT OFFICE.

ISAIAH M. REAMS, OF DURHAM, NORTH CAROLINA.

IMPROVEMENT IN WRITING INKS OR FLUIDS.

Specification forming part of Letters Patent No. 156,379, dated October 27, 1874; application filed April 28, 1874.

*To all whom it may concern:*

Be it known that I, ISAIAH M. REAMS, of Durham, in the county of Orange and State of North Carolina, have invented certain new and useful Improvements in Writing Ink or Fluid, of which the following is a specification:

This invention has for its object to produce a writing ink or fluid which possesses the characteristics of brilliance, permanence, indestructibility, combined with cheapness and perfect fluidity.

In carrying out my invention I take extract of logwood, one and a half ounce; bichromate of potassa, forty-eight grains; prussiate of potassa, forty-eight grains; alcohol, one-half ounce; and combine the various ingredients with a suitable quantity of water to produce one gallon of ink.

The prussiate of potassa, which is insoluble in alcohol, is dissolved in water, and the coloring matters from the extract of logwood are extracted in any suitable manner.

By the combination of the ingredients above stated, a writing-fluid is produced which possesses all the requisites of a good ink, as, owing to the presence of the bichromate of potassa, the coloring matters are fixed and brightened, and, furthermore, the ink will also flow freely from the pen and be rendered black and permanent by exposure.

I am also enabled by my invention to furnish a writing-fluid which cannot be erased by any common method of fraudulent obliteration without the destruction of the paper.

The alcohol will tend to prevent the ink from becoming moldy; but, in furtherance of the same object, oil of cloves or other suitable material may be added to the ink.

I do not confine myself to the exact proportions above specified, as the same may be varied to produce an ink more or less dark.

Having thus fully described my invention, what I claim is—

A writing fluid or ink composed of the ingredients described, in about the proportions specified.

In testimony that I claim the foregoing I have hereunto set my hand this 15th day of March, 1874.

ISAIAH MARRION REAMS.

Witnesses:
JOHN A. MCMANNEN,
JAMES A. J. BARBEE.